United States Patent [19]

MacPherson et al.

[11] Patent Number: 4,949,194
[45] Date of Patent: Aug. 14, 1990

[54] CERAMIC SUPPORT ARM FOR MOVABLY POSITIONING TRANSDUCERS

[75] Inventors: John A. MacPherson, San Diego, Calif.; Ernest V. Johnson, Phillipston, Mass.

[73] Assignee: Quest Technology Corporation, San Diego, Calif.

[21] Appl. No.: 160,883

[22] Filed: Feb. 26, 1988

[51] Int. Cl.⁵ .............................................. G11B 5/48
[52] U.S. Cl. ...................................... 360/104; 360/106
[58] Field of Search ................................. 360/104, 106

[56] References Cited

U.S. PATENT DOCUMENTS

| 2,783,311 | 2/1957 | Scott | 179/100.2 |
|---|---|---|---|
| 3,311,711 | 3/1967 | Maryatt et al. | 179/100.2 |
| 3,654,402 | 4/1972 | Roos | 179/110 A |
| 3,767,209 | 10/1973 | Seehawer | 274/4 R |
| 3,769,467 | 10/1973 | Gabor | 179/100.2 |
| 3,930,560 | 1/1976 | Carlson et al. | 181/160 |
| 3,931,641 | 1/1976 | Watrous | 360/104 |
| 3,936,881 | 2/1976 | Orlando et al. | 360/103 |
| 4,151,573 | 4/1979 | Tandon et al. | 360/104 |
| 4,188,645 | 2/1980 | Ragle et al. | 360/75 |
| 4,216,505 | 8/1980 | Grant et al. | 360/104 |
| 4,422,115 | 12/1983 | Spash | 360/104 |
| 4,443,824 | 4/1984 | Frater et al. | 360/104 |
| 4,549,238 | 10/1985 | Ertingshausen et al. | 360/103 |
| 4,625,249 | 11/1986 | Iwata | 360/104 |
| 4,647,998 | 3/1987 | Onohara et al. | 360/105 |
| 4,700,250 | 10/1987 | Kuriyama | 360/104 |
| 4,792,875 | 12/1988 | Ohdaira | 360/104 |

FOREIGN PATENT DOCUMENTS

| 0101776 | 6/1985 | Japan | 360/104 |
|---|---|---|---|
| 0157777 | 8/1985 | Japan | 360/104 |
| 0198481 | 9/1986 | Japan | 360/104 |

Primary Examiner—Robert S. Tupper
Assistant Examiner—Andrew L. Sniezek
Attorney, Agent, or Firm—Pennie & Edmonds

[57] ABSTRACT

A support arm is adapted for high-speed positioning of a transducer such as a read/write head in a magnetic disk drive. The support arm is essentially composed of a ceramic material having a high specific stiffness. The support arm is shaped to form structures integral of the support arm for mating with fasteners for connecting a transducer assembly to one end of the support arm and for connecting the support arm to a positioning actuator.

16 Claims, 2 Drawing Sheets

CERAMIC SUPPORT ARM FOR MOVABLY POSITIONING TRANSDUCERS

TECHNICAL FIELD

The present invention relates generally to support arms for movably positioning transducers, such as support arms for the high-speed positioning of read/write heads in magnetic disk drives.

BACKGROUND ART

Magnetic disk drives are widely used in computers and data processing systems for storing information in digital form. Digital information is stored in magnetic disk drives as binary-encoded data which is magnetically recorded on a recording surface of a magnetic disk by selective magnetic polarization of regions of the surface of the disk. The recording surface of the magnetic disk is typically divided into narrow annular regions termed "tracks" of different radii. The tracks are assigned numbers to provide addresses for locating data on the recording surface. In modern magnetic disk drives, adjacent tracks are closely spaced—center-to-center separations of adjacent tracks of as little as 50 μm are not uncommon.

Data stored on a magnetic disk is accessed as the disk rotates by means of a transducer called a read/write head. To read data from a rotating magnetic disk, the read/write head produces electronic read signals in response to the passage of magnetic polarized regions on the recording surface of the magnetic disk close by the read/write head as the disk rotates. To write data onto a rotating magnetic disk, the read/write head generates magnetic fields capable of polarizing regions of the recording surface disk passing close by the head in response to the imposition of electronic write signals on the read/write head.

The read/write head is positioned laterally at a radial position in registry with a selected track by means of a read/write head support assembly. In conventional magnetic disk drives, the read/write head support assembly includes a support arm which is connected at one end to a support-arm positioning actuator such as a stepper motor, a rotary voice-coil actuator, or a linear induction motor. The support arm extends over the rotating disk in a cantilevered fashion from a position radially outward of the circumference of the disk. For rigid magnetic disks, the read/write head is typically joined to the end of the support arm opposing the end attached to the positioning actuator by a blade-like read/write-head support finger which is flexible in the direction normal to the recording surface of the disk. An air flow is created adjacent to the recording surface by the rotation of the magnetic disk, which generally causes the read/write head to ride at an aerodynamically-stabilized distance from the surface of the disk. The distance separating the surface of the rotating magnetic disk and the read/write head has been decreasing as the art advances and in some current magnetic disk drives is less than a micrometer.

To read and write data at the high rates required by present-day computer systems, the read/write head must be brought into registry with the track on the magnetic disk to be read from or written into in as short a time as possible. Consequently, the lateral positioning of the read/write head—i.e. positioning parallel to the plane of the recording surface of the magnetic disk—must be done at high speeds. High-speed lateral positioning of the read/write head, however, induces inertial loading of the read/write-head support assembly. Unfortunately, such inertial loading tends to cause the read/write head to overshoot the desired position laterally and tends to excite lateral vibrations in the read/write-head support assembly, especially in the cantilevered support arm of the assembly. Such lateral vibrations are particularly troublesome when the support arm decelerates abruptly to stop. Since the support arm is supported at the end opposite to the end to which the read/write head is connected, the lateral vibrations tend to be greatest in magnitude at the end of the support arm connected to the read/write head. The overshoot and lateral vibrations induced by the inertial loading of the read/write-head support assembly caused by starting accelerations and stopping decelerations of the support assembly tend to lengthen the time required for the read/write head to stabilize at a new position, thereby limiting the speed at which data on the disk may be successfully accessed.

In addition, vibrations in a direction normal to the surface of the disk excited by motion of the support arm may result in collisions between the read/write head and the recording surface of the disk, especially in view of the close separation between the head and the surface of the disk commonly used today. Such collisions can damage the read/write head as well as the disk, leading to downtime, expensive repairs and lost data.

In addition to requirements of high-speed data access, modern magnetic disk drives are subject to size constraints, since digital computers and data processing systems are generally being made smaller. As magnetic disk drives are made more compact, the read/write-head support assemblies tend to be small and intricately shaped. Support arms for the read/write-head support assemblies are frequently made of an aluminum alloy or a magnesium alloy, in part because such materials can readily be fabricated by conventional metal forming and machining techniques into the intricate shapes needed for read/write-head support arms with the dimensional precision required by the need to register the read/write-head accurately with individual ones of the closely-spaced tracks on the magnetic disk.

A property of a material which measures the resistance of a component made from that material to deflection by inertial loads generated by accelerations and decelerations is the "specific stiffness" of the material. Specific stiffness is defined to be the modulus of elasticity (E) of a material under tension divided by the density of the material ($\rho$) and can be expressed by the equation:

Specific Stiffness = $E/\rho$.

The specific stiffness value of a particular material is typically represented by "m".

The magnesium and aluminum alloys typically used for making the support arms for the read/write-head support assemblies of magnetic disk drives have specific stiffness values of roughly $2.5 \times 10^6$ m.

A number of ceramic materials exhibit a higher specific stiffness than conventional magnesium and aluminum alloys. For example, alumina ($Al_2O_3$) has a specific stiffness of roughly $9 \times 10^6$ m and silicon carbide (SiC) has a specific stiffness of roughly $20 \times 10^6$ m. Although such ceramics have high specific stiffness values, they are generally extremely hard and brittle. It has therefore been impractical, if not impossible, to machine such materials into the intricate shapes required for support arms for the read/write-head support assemblies of magnetic disk drives. Conventional ceramic-forming techniques involving casting and firing to produce support arms of the required shape from such ceramics are also impractical because the variations in dimensions from part to part exceed the required tolerances.

Attempts have been made to combat the problem of vibrations in transducer support assemblies of magnetic disk drives, but heretofore such attempts have met with only limited success.

U.S. Pat. No. 3,769,467 to Gabor discloses a vibration damped transducer head assembly. The transducer head assembly is mounted at the end of a movable arm in a magnetic disk drive unit. An energy-absorbing material is interposed between the transducer head structure and an overhanging mass of relatively dense material. The energy absorbing material becomes lossier as the rapidity of the deforming impulse acting on the absorbing material increases. According to the patent, this tends to dampen vibrations caused by acceleration and deceleration forces generated in operating the disk drive. However, both the energy-absorbing material and the overhanging mass add significantly to the mass of the transducer head assembly, which tends to retard the ability of the assembly to accelerate and decelerate.

U.S. Pat. No. 3,936,881 to Orlando and Weidenhammer discloses an air-damped suspension mechanism for supporting a transducing head in a flexible disk recording device. The suspension system tends to dampen vibrations in the direction generally normal to the disk, but evidently does not dampen lateral vibrations. Moreover, the suspension mechanism requires an air supply system for supplying air to the suspension mechanism at a pressure greater than the surrounding pressure.

SUMMARY OF THE INVENTION

I have invented a ceramic support arm which permits transducers such as read/write heads to be accurately positioned at high speeds and which avoids problems of the prior art noted above.

Broadly, the support arm of the invention is configured to movably position and support a transducer assembly in a cantilevered fashion. The support arm is essentially composed of a ceramic material having a specific stiffness in excess of about $5 \times 10^6$ m. Preferred ceramic materials of which the support arms of the invention may be made include alumina and silicon carbide. The support arm of the invention has a positioning-actuator connection end for connection to a positioning actuator and a transducer-assembly connection end for connection to the transducer assembly. The transducer-assembly connection end of the support arm is shaped to define transducer-assembly-connection structures integral of the support arm for mating with transducer-assembly-fastener elements to connect the transducer assembly to the support arm. The positioning-actuator connection end of the support arm is shaped to define positioning-actuator-connection structures integral of the support arm for mating with positioning-actuator-fastener elements to connect the support arm to the positioning actuator.

The support arm of the invention is preferably shaped to define an outer frame and a plurality of bracing members extending within the outer frame and connected to it for strengthening the support arm. The outer frame and the bracing members define a plurality of lightening openings passing through the support arm. The bracing members and elements forming the outer frame of such preferred support arms may have a rectangular, I-beam, L-beam, channel-shaped or other configuration. The cross sectional shape and dimensions of the bracing members and the elements forming the outer frame may advantageously be selected to reduce the weight of the support arm and increase the resistance of the support arm to deflections induced by the inertial loadings to which it will be subjected in use. In particular, it may be advantageous in certain applications to taper or otherwise vary the cross-sectional dimensions or shape of the bracing members and support-frame elements over the length of the support arm to reduce weight and increase the resistance to overshoot and lateral vibrations induced by the inertial loadings. The outer frame and bracing members may have a foil shape for reduced air resistance, if desired.

Preferred ceramic support arms of the invention are light weight, yet sufficiently rigid to resist the overshoot and lateral vibrations induced by the inertial loading brought on by the starting accelerations and stopping decelerations of the support arms in positioning transducers at high speeds.

In a preferred embodiment of the support arm, one or more metallic conductors extend along the surface of the support arm to form electrically-conductive paths. Such electrically-conductive paths on the support arm may be used to transmit electrical signals to and from the transducer at the end of the support arm. The metallic conductors may be applied to the support arm by conventional printed-circuit techniques, such as screening a desired pattern of metallic ink onto the support arm and then heat treating the support arm to fuse a metallic component of the ink to form the metallic conductors in the desired pattern and bind them to the surface of the support arm. The metallic conductors may be applied to the upper surface, the lower surface or both the upper surface and the lower surface of the support arm, if desired. Since certain preferred ceramic materials out of which the support arm may be composed are electrically insulating, no insulating layer is required between the metallic conductors and the support arm, in contrast to conductors on conventional aluminum or magnesium alloy support arms. Integrated circuits—for preamplification or signal conditioning, for example—may be connected to the metallic conductors and carried on the support arm, if desired.

Preferred support arms of the invention may be used to advantage in a magnetic disk drive of the type having at least one rigid magnetic disk for the storage of data and a read/write head assembly for reading from and writing to the magnetic disk. The read/write-head assembly may be attached at one end to such a preferred support arm. The support arm may be attached at the opposing end to a positioning actuator such as a rotary voice coil or stepper motor for positioning by pivotal motion or to a linear induction motor for positioning by linear advancement and retraction.

Preferably, the transducer-assembly connection end of the support arm is shaped to form a plurality of internally-threaded screw holes configured to receive transducer-assembly-fastening screws for connecting the transducer assembly to the support arm. The positioning-actuator connection end of the support arm may include internally-threaded screw holes for attaching the support arm securely to the positioning actuator.

In a further preferred embodiment of the invention, a plurality of ceramic support arms are arranged in an aligned stacked relationship to form a stacked support-arm assembly. Each pair of adjacent support arms in the stacked support-arm assembly are separated by a spacer located generally at the position-actuator connection ends of the support arms. The spacer is preferably made of the same ceramic material as the support arms, although in certain applications it may be advantageous to make the spacers of a different material. Such stack support-arm assemblies advantageously used in multi-disk magnetic disk drives. Alternatively, an integral stacked support-arm unit may comprise a plurality of support-arm members, each such support-arm member at one end is commonly connected to and integrally formed with a columnar trunk. Preferred stacked support-arm units of the invention are unitary structures formed of a ceramic material of high specific stiffness.

Although a variety of methods may be used to manufacture the ceramic support arm of the invention, a process involving injection molding is preferred. Broadly, the preferred process for manufacturing ceramic support arms of the invention involves preparing a ceramic-loaded molding compound from a powdered ceramic and an organic binder system, injection molding the ceramic-loaded molding compound to form "green" parts, removing at least one component of the binder system from the green parts to form self-supporting, porous "stripped" parts and heating the stripped parts to eliminate essentially any remaining binder system and to sinter the ceramic powder to produce the finished support arms.

The preferred injection-molding process allows mass production of dimensionally-accurate ceramic support arms of the invention by a method which is cost competitive with conventional casting processes for ceramic articles. The preferred injection-molding process permits such parts to be produced with little or no secondary operations such as machining and finishing. With the preferred injection-molding process, the support arm of the invention may be readily made in a wide variety of shapes and structures. For example, the support arm could include bracing members in various configurations and open areas of various geometries. Significantly, the preferred injection molding process permits ceramic support arms to be made having holes formed in it with internally-threaded surfaces which do not require tapping or other machining operations to cut the threads.

A preferred process for manufacturing the ceramic support arm of the invention involves the following steps. A finely-divided ceramic powder such as powdered alumina or powdered silicon carbide is blended with an organic binder system at a temperature above the melting point of the binder to form a ceramic-loaded molding compound. The organic binder system preferably includes an extractable binder component, an essentially non-extractable binder component, and an extractable plasticizer. A particularly preferred organic binder system includes three ingredients: polystyrene as the extractable binder component, polyethylene as the essentially non-extractable binder component, and a hydrogenated vegetable oil as the plasticizer. A mold lubricant such as stearic acid is preferably included as well. The ceramic-loaded molding compound is thermoplastic and can be molded in conventional injection-molding equipment for thermoplastic polymers, which is a significant advantage.

The preferred manufacturing process involves forming a molded part of the shape desired for the arm by injection molding the molding compound. The linear dimensions of the molded part—termed a "green" part at this stage of the process—are greater than the dimensions desired for the final part to account for shrinkage of the part in subsequent processing.

The green part is then preferably immersed in one or more solvents—ethyl alcohol and trichloroethylene in sequence are particularly preferred—which are capable of dissolving the extractable binder component and the plasticizer, but which are effectively incapable of dissolving the essentially non-extractable binder component and the ceramic powder. The green part is immersed in the solvent or solvents for a time sufficient to extract a substantial fraction of the plasticizer and the extractable binder component from the part. The part is then withdrawn from the solvent and dried. The resulting part—termed a "stripped" part at this stage—is porous because of the extraction of plasticizer and extractable binder component, but is self-supporting and retains its shape because of the essentially non-extractable binder component which remains in the part.

The stripped part is then placed in a furnace for heat treatment. The part is gradually heated—preferably in an oxidizing atmosphere—to decompose thermally and drive off the remaining binder, which after the extraction step is preferably principally composed of the essentially non-extractable component. Because the stripped part is initially porous, gaseous decomposition products from the remaining binder component can escape from the part during the heat-treatment step without blistering or otherwise distorting the shape of the part. The temperature of the furnace is ultimately raised to a temperature sufficiently close to the melting point of the ceramic to sinter the ceramic particles. During the heat-treatment step, the stripped part shrinks generally isotropically to the desired dimensions for the finished support arm. If desired, the final sintered support arm can be essentially nonporous, with bulk structural properties similar to those of ceramic parts produced by conventional casting processes.

Ceramic materials of which the support arms of the invention are made preferably have a specific stiffness in excess of about $5 \times 10^6$ m. More preferably, the ceramic materials have a specific stiffness in excess of about $7.5 \times 10^6$ m. For example, alumina, a particularly preferred material of which to make the support arm of the invention, has a specific stiffness of roughly $9 \times 10^6$ m.

Preferred ceramic materials for support arms of the invention have a lower coefficient of thermal expansion than conventional aluminum and magnesium alloys. Consequently, a support arm composed of such ceramic materials expand or contract significantly less than support arms formed of a conventional aluminum or magnesium alloy. For example, typical magnesium and aluminum alloys have coefficients of thermal expansion of about $38 \times 10^{-6}$ m/m/°C. and about $23 \times 10^{-6}$ m/m/°C., respectively, which are substantially greater than the coefficients of thermal expansion of about $7 \times 10^{-6}$ m/m/°C. and about $4.5 \times 10^{-6}$ m/m/°C. for alumina and silicon carbide, respectively. Alumina and silicon carbide thus offer an approximately 3 to 10 times improvement in dimensional stability over conventional aluminum or magnesium alloy for equivalent temperature variations.

Preferred ceramic support arms of the invention exhibit greater stiffness than support arms of equivalent weight and overall dimensions made of conventional aluminum or magnesium alloy. As a result, such preferred support arms of the invention may be used to position read/write heads in magnetic disk drives at significantly greater speeds than the conventional support arms and nonetheless resist lateral overshoot and lateral vibrations to as great an extent as—or even to a greater extent than—the conventional support arms. Alternatively, for a given degree of overshoot at a given positioning speed, preferred ceramic support arms of the invention may be made significantly lighter in weight than conventional support arms of equivalent overall dimensions made of aluminum or magnesium alloy. Reductions in weight in such preferred support arms permit the power of the positional actuators of the magnetic disk drives to be reduced, which in turn advantageously permits reductions in heat dissipation, size, and cost for the magnetic disk drives incorporating the preferred support arms.

BRIEF DESCRIPTION OF THE DRAWINGS

Preferred embodiments of the invention are described below with the following drawings.

BEST MODE FOR CARRYING OUT THE INVENTION

Figure 1:
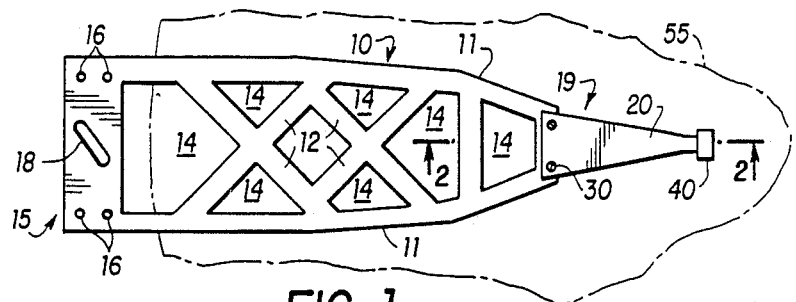
FIG. 1 is a top view of a first preferred ceramic support arm of the invention connected to a read/write head assembly.

Referring now to FIG. 1, a support arm 10 for use in a magnetic disk drive has an outer frame 11 and bracing members 12. The bracing members 12 extend within and are connected to the outer frame 11 to rigidify the support arm 10. The support arm 10 is composed of alumina and is made by a process involving injection molding, leaching and sintering which is described below. The bracing members 12 and the outer frame 11 define a plurality of lightening holes 14. The lightening holes 14 serve to minimize the weight of the support arm 10 consistent with the rigidity specifications of the support arm.

The support arm 10 has a position-actuator connection end 15 and a read/write-head-assembly connection end 19. By way of four fastener-holes 16 and a slot 18 in the position-actuator connection end 15, the support arm 10 is attached to a high-speed rotary voice-coil actuator (not shown) which serves as a positioning actuator. The fastener holes 16 and the slot 18 pass through the support arm 10 and are shaped to receive fasteners (not shown) to connect the support arm securely to the actuator.

Figure 2:
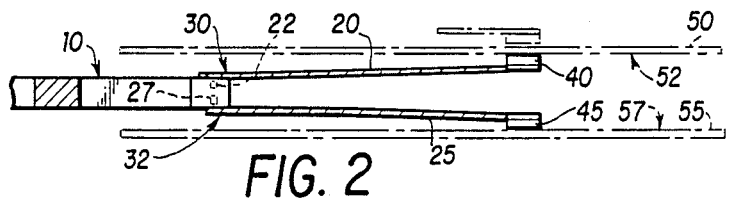
FIG. 2 is an expanded cross-sectional view taken along line 2—2 of FIG. 1.

As may be seen in FIG. 2, an upper read/write head 40 and a lower read/write head 45 are respectively mechanically connected to the support arm 10 by way of upper and lower read/write-head support fingers 20 and 25. The electrical connections to the upper and lower read/write heads 40 and 45 are not shown in FIGS. 1 and 2 for simplicity. The read/write-head-assembly connection end 19 of the support arm 10 has four screw holes 22, 27 formed in it which are threaded internally. The read/write-head support fingers 20, 25 are connected to the support arm 10 by way of screws 30, 32 which are threaded into the internally-threaded screw holes 22, 27.

As shown in FIG. 2, the upper read/write head 40 is located closely adjacent to a recording surface 52 on an under side of an upper magnetic disk 50. The lower read/write head 45 is located closely adjacent to a recording surface 57 on an upper side of a lower magnetic disk 55. The upper support finger 20 is resilient and is biased to urge the upper read/write head 40 towards the recording surface 52. Rotation of the magnetic disk 50 generates an air flow which aerodynamically counterbalances the force urging the read/write head 40 towards the recording surface 52, with the result that the read/write head 40 rides at an aerodynamically-stabilized position spaced apart from the recording surface. The separation between upper read/write head 40 and the under-side recording surface 52 of the upper magnetic disk 50 shown in FIG. 2 has been exaggerated for clarity. The lower read/write head 45 is similarly urged toward the recording surface 57 on the upper side of the lower magnetic disk 55 by the resiliency of the lower support finger 25 and counterbalanced aerodynamically by the air flow generated by the rotation of the disk, so that the head rides at an aerodynamically stabilized position spaced apart from the recording surface.

Figure 3:
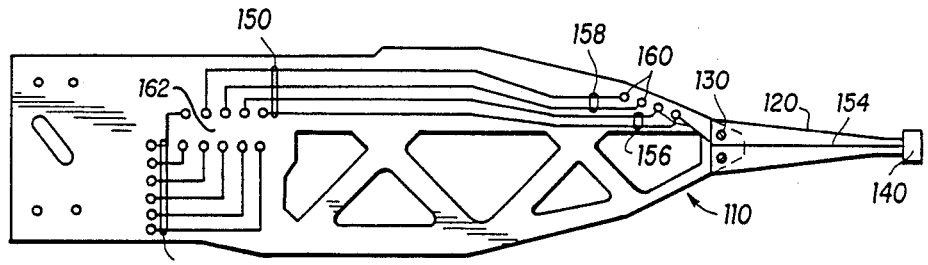
FIG. 3 is a top view of second preferred ceramic support arm of the invention having metallic conductors deposited on the surface of the support arm.

Referring now to FIG. 3, a support arm 110 for supporting a read/write head in a magnetic disk drive is made of alumina. The support arm 110 has ten copper-metal conductors 150, 152 deposited on it for conducting signals on the support arm. An upper read/write head 140 is mechanically connected to the support arm 110 by a read/write-head support finger 120 which is attached to the support arm 110 by screws 130 which are threaded into internally-threaded screw holes (not shown) formed in the support arm. A twin-wire lead 154 electrically connects the read/write head 140 to two upper read/write-head signal paths 156 which extend along the length of the support arm 110. A lower read/write head (not shown) is connected to two lower read/write-head signal paths 158 through two feed-through openings 160 which pass between the upper and lower surfaces of the support arm 110. An integrated-circuit preamplifier and signal conditioner (not shown) can be mounted on the support arm 110 at an integrated-circuit chip connection location 162 and connected to the conductors 150, 152 which terminate at the integrated-circuit chip-connection location 162. The conductors 150, 152 are deposited on the support arm 110 by conventional printed-circuit techniques for printing copper conductors on alumina substrates. The conductors 150, 152 remain securely in place in spite of the rapid movements of the support arm.

Figure 4:
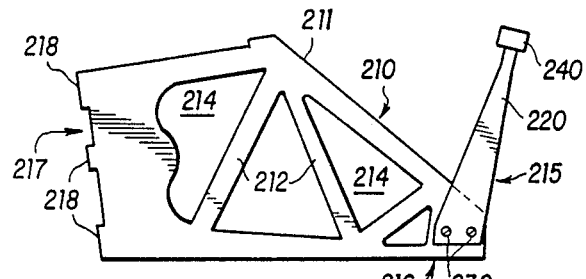
FIG. 4 is a top view of a third preferred ceramic support arm of the invention.
Figure 5:
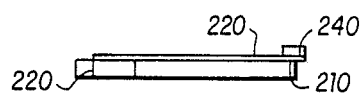
FIG. 5 is an end view of the device of FIG. 4.

Referring now to FIGS. 4 and 5, an alumina support arm 210 for a magnetic disk drive is connected to a read/write-head assembly 215. The read/write-head assembly 215 includes a read/write head 240 connected to a read/write-head support finger 220. The support finger 220 is connected to a read/write-head-assembly connection end 216 of the support arm 210 and projects at an angle roughly normal to a longitudinal axis of the support arm. The support arm 210 has an outer frame 211 and three bracing members 212 which together form four lightening holes 214. The bracing members 212 and lightening holes 214 are provided and structured so as to lighten the weight of the support arm 210 and yet provide sufficient resistance to lateral overshoot and lateral vibration. The support arm 210 is attached at a positioning-actuator connection end 217 to a rotary voice-coil positioning actuator (not shown). Three tabs 218 projecting outward from the positioning-actuator connection end 217 of the support arm mate with three effectively complementary receptacles of the positioning actuator for connecting the support arm to the actuator.

Figure 6:
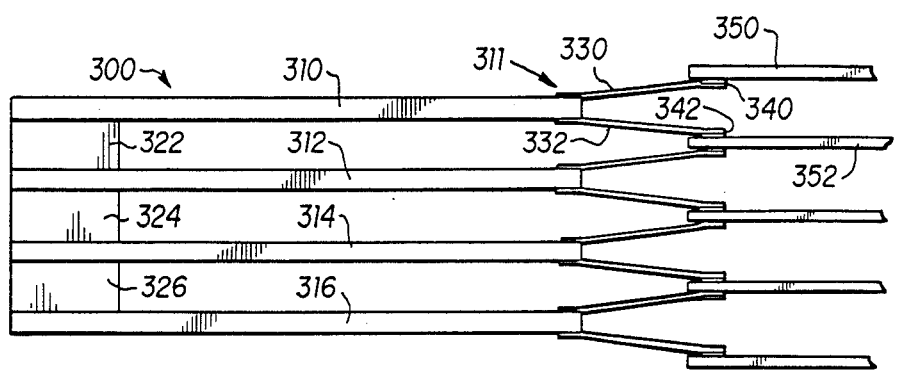
FIG. 6 is a side view of a preferred stacked support-arm assembly of the invention.

Referring now to FIG. 6, a stacked support-arm assembly 300 includes four support arms 310, 312, 314, 316 disposed in an axially aligned, stacked arrangement for use in a multi-disk magnetic disk drive. Adjacent pairs of the support arms 310, 312, 314, 316 are separated from one another by spacers 322, 324, 326. The support arms and the spacers are made of alumina. Each of the support arms 310, 312, 314, 316 has the cross-braced configuration of the support arm 10 of FIG. 1 discussed above. The use of such stacked magnetic disks increases the storage capacity of a magnetic disk drive relative to a single-disk magnetic disk drive. In addition, the stacked support-arm assembly 300 permits more than one magnetic disk to be accessed at a time, thus increasing the rate at which data which can be read from or written to the magnetic disk drive.

The uppermost support arm 310 of the stacked support-arm assembly 300 is attached to upper and lower read/write-head support fingers 330, 332 by screws threaded into internally-threaded screw holes (not shown) formed in a read/write-head-assembly connection end 311 of the support arm 310. The upper and lower read/write-head support fingers 330, 332 in turn are connected respectively to upper and lower read/write heads 340, 342. The upper read/write head 340 accesses an under-side recording surface of an uppermost magnetic disk 450 and the lower read/write head 442 accesses an upper-side recording surface of a next-lower magnetic disk 452. The remaining three support arms 312, 314 and 316 access the remaining disks in a similar manner by way of similar read/write-head support fingers and read/write heads.

The positional tolerances required for each support arm in the stacked support-arm assembly relative to the magnetic disks the support arm accesses is essentially the same as the positional tolerances required for a single support arm in a non-stacked arrangement relative to the magnetic disks the non-stacked support arm accesses. As a result, the tolerances for the dimensions of the support arms and spacers making up the stacked support-arm assembly are ordinarily significantly tighter than the tolerances for the dimensions of a single non-stacked support arm used alone to achieve the required positional tolerances. For example, if a positional tolerance of ±50 μm must be satisfied by a single support arm individually and by each support arm in the stacked support-arm assembly 300, the single support arm may be made to a dimensional tolerance of ±50 μm, whereas a tighter dimensional tolerance must be met by the seven components of the assembly to allow for worst-case cumulative variations in dimensions. Specifically, the four support arms and the three spacers must be dimensionally accurate to within ±(50)/7 μm, or approximately ±7 μm. The larger the number of support arms in such a stacked support-arm assembly, the more difficult and expensive it becomes to satisfy the dimensional tolerances of individual components.

Figure 7:
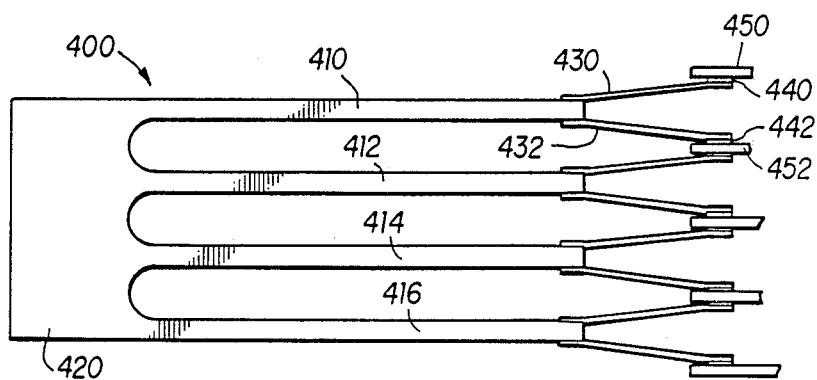
FIG. 7 is a side view of a preferred stacked support-arm unit of the invention.

Referring now to FIG. 7, an integral stacked support-arm unit 400 for use in a multi-disk magnetic disk drive has four support-arm members 410, 412, 414 and 416, each of which is at one end commonly attached to and integrally formed with a columnar trunk 420. An opposing end of each of the support-arm members has internally-threaded screw holes (not shown) for attaching upper and lower read/write head assemblies. For example, an uppermost support-arm member 410 is attached to upper and lower read/write-head support fingers 430, 432 which in turn are connected to upper and lower read/write heads 440, 442. Each support-arm member 410, 412, 414, 416 of the stacked support-arm unit 400 has a cross-braced structure with lightening openings generally as shown for the support arm 10 of FIG. 1 discussed above.

The stacked support-arm unit 400 may be made as a unitary structure composed of alumina by the preferred injection molding process described below. Since the unit is formed integrally, the satisfaction of any required tolerances for the dimensions of the support-arm members and for their positions relative to the magnetic disks they are to access is facilitated.

Basic Parameters of Preferred Process for Making Invention

The support arms of the invention may be made by the following process.

As a first step, the process involves forming a mixture of a ceramic powder and an organic binder system. Powdered alumina and powdered silicon carbide are preferred ceramic powders, with powdered alumina being particularly preferred. The particle size of the ceramic powder is limited principally by what will properly flow through an inlet nozzle of an injection-molding machine. Fine particles tend to be more reactive and therefore tend to form high-density, fine-grained microstructures after sintering, which in turn typically results in improved mechanical properties for the sintered part. Ceramic powders as fine as about 0.3 μm can be readily molded. Alternatively, if a coarse-grained, open structure is desired—for reduced density, for example—ceramic powders as coarse in particle size as about 590 μm (28 mesh) may be molded. However, any suitable particle size for the ceramic powder may be used, including particle sizes finer than about 0.3 μm and particle sizes larger than about 590 μm.

The organic binder system is thermoplastic and preferably comprises a polymeric binder which in turn includes a first binder component which is effectively non-extractable and a second binder component which is extractable. The binder system also preferably comprises an extractable plasticizer to render the system moldable and an extractable mold lubricant to aid in releasing the formed shape from the mold. A particularly preferred binder system includes polyethylene as the effectively non-extractable binder component, polystyrene as the extractable binder component, hydrogenated vegetable oil as the extractable plasticizer, and stearic acid as the extractable mold lubricant. Carnauba wax, polyethylene glycol and silicone oil are also suitable extractable lubricants.

The organic binder system is preferably mixed with the ceramic powder at a temperature above the melting point of the binder system to form a ceramic-loaded molding compound of effectively uniform consistency. The molding compound is then injected by an injection-molding machine into a mold having a cavity shaped to form a support arm of the desired configuration. Since the molded part shrinks generally isotropically during subsequent processing, the mold-cavity dimensions should be isotropically expanded to account for the shrinkage. To form support arms having holes with internal threads, molds with unscrewable cores may be used. Such unscrewable cores should have a diameter and a thread pitch which is expanded relative to the desired diameter and thread pitch to take account of subsequent shrinkage of the molded part. The injection-molding machine may be of the type conventionally used for injection molding ordinary thermoplastic polymer resins. Preferably, the ceramic-loaded molding compound is injected into the mold through a nozzle by pressurized air or by a plunger. Alternatively, the ceramic-loaded molding compound can be forced through a barrel with a rotating screw which carries the compound to the mold.

The resulting "green" molded part is removed from the mold and treated with one or more solvents to extract the plasticizer and the extractable component of the binder. For example, the preferred plasticizer vegetable oil may be selectively extracted by placing the green part in a bath of ethyl alcohol, and the preferred extractable binder component polystyrene may then be extracted by placing the part in a bath of 1,1,1-trichloroethane. Preferably, the extraction of the plasticizer and the extractable component of the binder is carried out at a temperature below the melting point of any component of the binder system.

After treatment with the solvent or solvents, the non-extractable binder component will remain and serve to bind the ceramic particles to form a porous, self-supporting "stripped" part. The stripped part is placed in a furnace for heat treatment and sintering. The heat treatment and sintering is preferably carried out in an oxidizing atmosphere. The stripped part is heated gradually to a sintering temperature to decompose and drive out the remaining binder and to sinter the ceramic particles. The part shrinks generally isotropically during the heat treatment and sintering. The porosity of the stripped part allows the non-extractable binder component to be driven out without deforming the part during the heat treatment and sintering process.

EXAMPLE

An alumina-loaded molding compound is prepared by combining the ingredients listen in Table I below in the approximate proportions indicated.

TABLE 1

| INGREDIENT | WEIGHT PERCENT |
| --- | --- |
| Alumina | 85.6 |
| Polystyrene | 6.4 |
| Polyethylene | 0.8 |
| Vegetable Oil | 6.4 |
| Stearic Acid | 0.8 |

The alumina is a reactive, fine-grained powder with an average particle size of about 0.4 μm commercially available from the Aluminum Company of America of Pittsburgh, Pa. under the trade name "ALCOA A-16SG" alumina. The vegetable oil is a hydrogenated vegetable oil commercially available under the trade name "Hunt Wesson Oil" from BCI U.S. Food Corporation of Chicago, Ill. The ingredients are uniformly mixed in a high shear mixer at about 150° C. to form an alumina-loaded molding compound. The resulting molding compound is then pelletized.

The pelletized molding compound is formed into green parts in a screw-type injection-molding machine using a barrel temperature of about 150° C. The mold of the injection-molding machine has a cavity shaped and dimensioned to produce green parts with the shape desired for the finished support arm, but with dimensions isotropically greater by about 18 percent to account for subsequent shrinkage.

The green parts are removed from the mold of the injection-molding machine and placed in a bath of ethyl alcohol at room temperature for about 24 hours to remove selectively the vegetable oil plasticizer. Removal of the vegetable oil opens pores sufficiently to facilitate subsequent extraction of the polystyrene extractable binder component. The polystyrene binder component is removed by placing the parts in a bath of 1,1,1-trichloroethane for about 12 hours at room temperature. The resulting stripped parts are then removed from the bath and dried.

The stripped parts are subsequently placed in a furnace in an ambient air atmosphere. The temperature in the furnace is raised at about 7°/minute to about 540° C. and subsequently at about 20°/minute to about 1670° C. The parts are then sintered at about 1670° C. for about one hour in the ambient atmosphere. The heat treatment and sintering cycle takes about six hours in total. The sintered parts are allowed to cool in the furnace.

The finished support arms were shaped generally as shown in FIGS. 4 and 5, with a length of about 64 mm, a width of about 32 mm, and a thickness of about 3 mm. After sintering, the support arms had an apparent specific gravity of approximately 3.889 or about 98 percent of the theoretical specific gravity of alumina.

It is not intended to limit the present invention to the specific embodiments described above. For example, transducers may be connected directly to the support arm, if desired. Transducers other than read/write heads for magnetic disks may be used, such as electro-optical transducers for accessing data stored on optical disks. The support arms of the invention may be used to advantage with either floppy disks and rigid disks and with either single-sided disks or double-sided disks. Stacked support-arm assemblies and integral stacked support-arm units of the invention may incorporate two, three, four, five or other number of support arms. Lightening holes in support arms of the invention may be rectangular, circular, triangular or other shape. Alternatively, a support arm of the invention may have a solid construction without any openings passing through it, if desired. The ceramic support arm of the invention need not be manufactured by the preferred injection-molding process described above. It is recognized that these and other changes may be made in the support arm specifically described herein without departing from the scope and teaching with the instant invention and it is intended to encompass all other embodiments, alterations and modifications consistent with the invention.

We claim:

1. A dimensionally accurate support arm for movably positioning and supporting a transducer assembly in a cantilevered fashion, the support arm having a positioning-actuator connection end for connection to a positioning actuator and a transducer-assembly connection end generally opposed to the positioning-actuator connection end for connection to at least one transducer assembly, the support arm being essentially composed of a ceramic material having a specific stiffness in excess of $5 \times 10^6$ m and a coefficient of thermal expansion of less than about $7 \times 10^{-6}$ m/m/°C., the transducer assembly connection end of the support arm being shaped to define transducer-assembly-connection means integral of the support arm for mating with transducer-assembly-fastener means to connect the at least one transducer assembly to the support arm, the positioning actuator connection end of the support arm being shaped to define positioning-actuator-connection means integral of the support arm for mating with positioning-actuator-fastener means to connect the support arm to the positioning actuator.

2. The support arm of claim 1 in which the ceramic material has a specific stiffness in excess of about $7.5 \times 10^6$ m.

3. The support arm of claim 2 in which the ceramic material is selected from the group consisting of alumina and silicon carbide.

4. The support arm of claim 2 in which the support arm is shaped to define an outer frame and a plurality of bracing members extending in the same plane as the outer frame within and connected to the outer frame for strengthening the support arm, a plurality of lightening openings passing through the support arm being defined by the outer frame and the bracing members.

5. The support arm of claim 4 in which the transducer-assembly connection end of the support arm is shaped to form a plurality of internally-threaded holes configured to receive transducer-assembly-fastening screws for connecting the transducer assembly to the support arm.

6. The support arm of claim 2 further comprising a plurality of printed-circuit metallic conductors extending on said support arm.

7. The apparatus of claim 1 wherein said transducer assembly is a read/write-head assembly for reading from and writing to a rotating magnetic disk in a magnetic disk drive.

8. A dimensionally accurate support-arm assembly for movably positioning and supporting a plurality of transducer assemblies, the support-arm assembly comprising a plurality of support arms and a like plurality less one of support-arm spacers, the support arms being arranged in a substantially axially-aligned stacked relationship, each support arm having a transducer-assembly connection end for connection to at least one transducer assembly, each support arm being essentially composed of a ceramic material having a specific stiffness in excess of $5 \times 10^6$ m and a coefficient of thermal expansion of less than about $7 \times 10^{-6}$ m/m/°C., the transducer assembly connection end of each support arm being shaped to define transducer-assembly-connection means integral of the support arm for mating with transducer-assembly-fastener means to connect the at least one transducer assembly to the support arm, a support-arm spacer being located between the connected to each pair of adjacent support arms at ends of the support arms generally opposed to the transducer-assembly-connection ends of the support arms, the support-arm spacer maintaining the pair of support arms in a spaced apart relationship.

9. The support-arm assembly of claim 8 in which the ceramic material has a specific stiffness in excess of about $7.5 \times 10^6$ m.

10. The support arm assembly of claim 9 in which the ceramic material is selected from the group consisting of alumina and silicon carbide.

11. The spacer-arm assembly of claim 10 in which the support-arm spacers are essentially composed of the same ceramic material as the support arms.

12. A dimensionally accurate support-arm unit for movably positioning and supporting a plurality of transducer assemblies, the support-arm unit comprising a plurality of support-arm members, the support-arm members being arranged in a substantially axially-aligned stacked relationship, each pair of adjacent support-arm members being spaced apart from one another, each support-arm member having a transducer-assembly connection end for connection to at least one transducer assembly, the transducer-assembly connection end of each support-arm member being shaped to define transducer-assembly-connection means integral of the support-arm member for mating with transducer-assembly-fastener means to connect the at least one transducer assembly to the support-arm member, an end of each support-arm member generally opposed to the transducer-assembly-connection end of the support-arm member being connected to and integrally formed with a columnar trunk which extends substantially normally to the support-arm members, the support-arm unit being essentially composed of a ceramic material having a specific stiffness in excess of $5 \times 10^6$ m and a coefficient of thermal expansion of less than about $7 \times 10^{-6}$ m/m/°C.

13. The support-arm unit of claim 12 in which the ceramic material has a specific stiffness in excess of about $7.5 \times 10^6$ m.

14. The support arm unit of claim 13 in which the ceramic material is selected from the group consisting of alumina and silicon carbide.

15. A dimensionally accurate support arm for movably positioning and supporting at least one read/write-head assembly for reading from and writing to at least one rotating magnetic disc in a magnetic disc drive in a cantilevered fashion, the support arm having a positioning-actuator connection end for connection to a positioning actuator and a read/write-head assembly connection end generally opposed to the positioning-actuator connection end for connection to at least one read/write-head assembly, the support arm being essentially composed of a ceramic material having a specific stiffness in excess of about $7.5 \times 10^6$ m and a coefficient of thermal expansion of less than about $7 \times 10^{-6}$ m/m/°C., the read/write-head assembly connection end of the support arm being shaped to define read/write-head assembly connection means integral of the support arm for mating with read/write-head assembly-fastener means to connect the at least one read/write-head assembly to the support arm, the positioning actuator connection end of the support arm being shaped to define positioning-actuator-connection means integral of the support arm, for mating with positioning-actuator-fastener means to connect the support arm to the positioning actuator.

16. The support arm of claim 15 in which the ceramic material is selected from the group consisting of alumina and silicon carbide.

* * * * *